United States Patent
Ott

(10) Patent No.: US 11,537,539 B2
(45) Date of Patent: Dec. 27, 2022

(54) ACCELERATION OF DATA BETWEEN A NETWORK AND LOCAL I/O IN A NUMA SYSTEM

(71) Applicant: SOFTIRON LIMITED, Chilworth (GB)

(72) Inventor: Alan Ott, Oviedo, FL (US)

(73) Assignee: SOFTIRON LIMITED, London (GB)

(*) Notice: Subject to any disclaimer, the term of this patent is extended or adjusted under 35 U.S.C. 154(b) by 0 days.

(21) Appl. No.: 17/504,137

(22) Filed: Oct. 18, 2021

(65) Prior Publication Data

US 2022/0121583 A1  Apr. 21, 2022

Related U.S. Application Data

(60) Provisional application No. 63/093,415, filed on Oct. 19, 2020.

(51) Int. Cl.
| | | |
|---|---|---|
| G06F 13/00 | (2006.01) | |
| G06F 12/06 | (2006.01) | |
| G06F 13/16 | (2006.01) | |
| G06F 13/10 | (2006.01) | |

(52) U.S. Cl.
CPC ...... G06F 13/1668 (2013.01); G06F 12/0646 (2013.01); G06F 13/102 (2013.01); G06F 2212/2542 (2013.01)

(58) Field of Classification Search
CPC .............. G06F 13/1668; G06F 13/102; G06F 12/0646; G06F 2212/2542
USPC .......................................................... 710/27
See application file for complete search history.

(56) References Cited

U.S. PATENT DOCUMENTS

| | | | |
|---|---|---|---|
| 10,262,973 B1 * | 4/2019 | Hoyer | H01L 25/0655 |
| 10,496,594 B1 * | 12/2019 | Miller | G06K 9/6267 |
| 2014/0122634 A1 * | 5/2014 | Conner | H04L 47/33 709/212 |
| 2015/0067229 A1 | 3/2015 | Connor et al. | 710/317 |
| 2017/0052916 A1 * | 2/2017 | Kollu | G06F 13/4022 |
| 2017/0220499 A1 | 8/2017 | Gray | |
| 2018/0173547 A1 * | 6/2018 | Stokes | G06F 8/60 |
| 2018/0203734 A1 * | 7/2018 | Lowery | G06F 9/3889 |

(Continued)

FOREIGN PATENT DOCUMENTS

| | | | |
|---|---|---|---|
| EP | 3598310 A1 | 1/2020 | G06F 12/0897 |
| WO | 2020/000401 A1 | 1/2020 | G06F 3/06 |

OTHER PUBLICATIONS

International Search Report and Written Opinion, Application No. PCT/EP2021/079004, 12 pages, dated Feb. 10, 2022.

*Primary Examiner* — Christopher B Shin
(74) *Attorney, Agent, or Firm* — Slayden Grubert Beard PLLC

(57) ABSTRACT

A system includes a central processing unit (CPU) including semiconductor dies, wherein each semiconductor die includes processing cores. The system includes a multi-host network interface card (NIC). The NIC includes an external connection interface circuit and CPU interface circuits. The NIC is coupled to an external data source through the external connection interface circuit and to each the semiconductor dies through a respective CPU interface circuit. The NIC is configured to receive data from the external data source for a different peripherals separately connected to semiconductor dies, and route the data for peripherals through respective CPU interface circuits.

20 Claims, 1 Drawing Sheet

(56) References Cited

U.S. PATENT DOCUMENTS

| | | | |
|---|---|---|---|
| 2018/0302288 A1 | 10/2018 | Schmatz | |
| 2019/0325302 A1* | 10/2019 | Savic | G06F 9/45541 |
| 2019/0340313 A1* | 11/2019 | Adler | G06F 30/327 |
| 2020/0127946 A1 | 4/2020 | Levi et al. | |
| 2020/0409755 A1* | 12/2020 | MacNamara | G06F 12/0875 |
| 2020/0412655 A1* | 12/2020 | Thyagaturu | H04L 43/028 |
| 2022/0100692 A1* | 3/2022 | Subbareddy | G06F 30/30 |

* cited by examiner

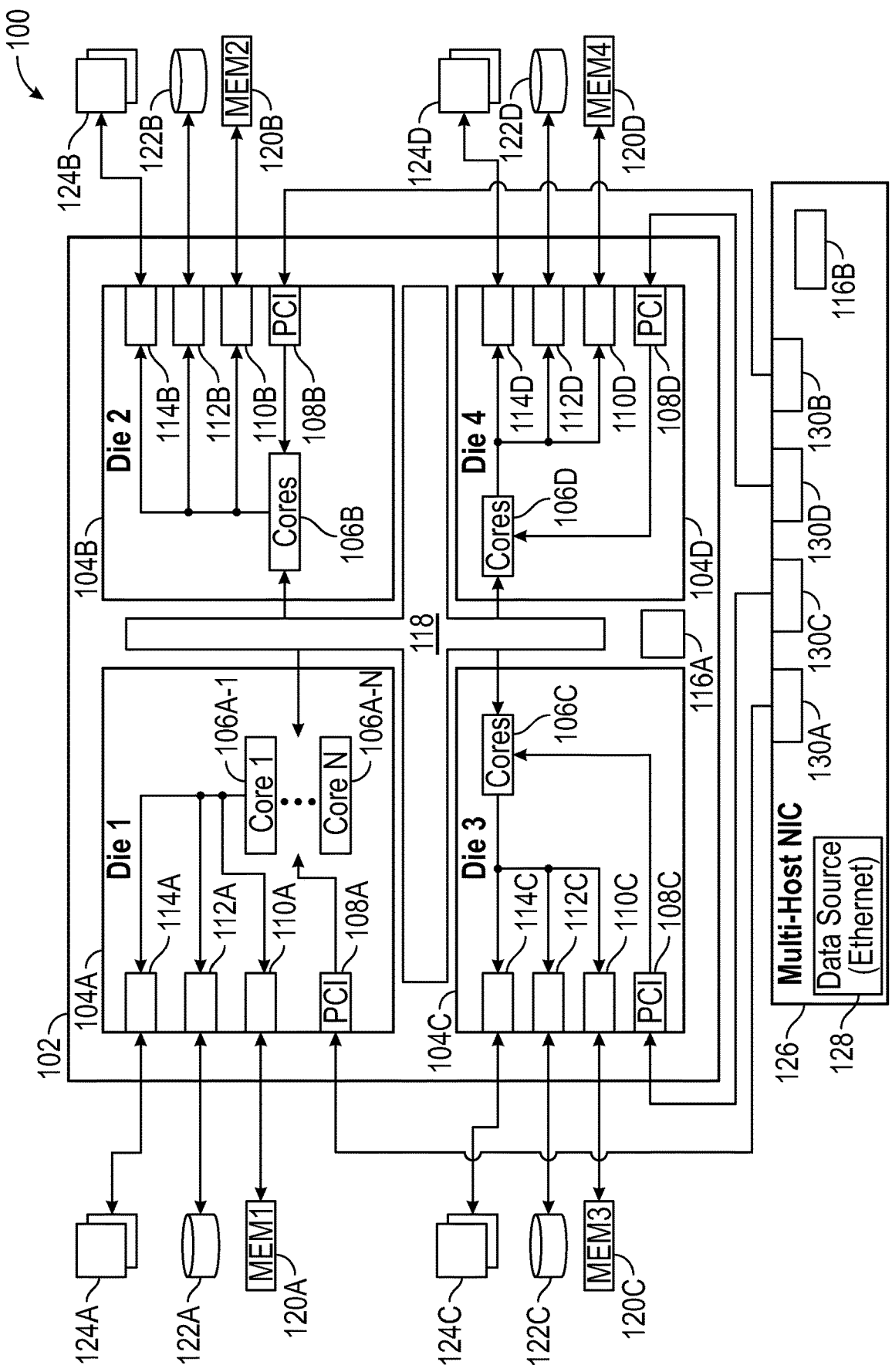

ACCELERATION OF DATA BETWEEN A NETWORK AND LOCAL I/O IN A NUMA SYSTEM

PRIORITY

The present application claims priority to U.S. Provisional Patent Application No. 63/093,415 filed Oct. 19, 2020, the contents of which are hereby incorporated in their entirety.

FIELD OF THE INVENTION

The present disclosure relates to memory management and input-output from computer processors and, more particularly, to acceleration of data between a network and local input/output (I/O) in a non-uniform memory architecture (NUMA) system.

BACKGROUND

In modern computing, the central processing unit (CPU) has increased in not just speed but in design complexity. Initially, a CPU was implemented as a single encapsulated device that contained a single die, typically a single piece of silicon containing the operational circuitry. The die would contain a single processing unit, or core. In subsequent designs, multiple CPU cores were added to this single die. In this way a single-CPU system would now, in many ways, behave as though it were a multiple-CPU system. In subsequent designs, a CPU can include multiple die, with each die containing multiple cores, combined into a single CPU. The die would be connected to one another internally using an inter-die data fabric, such as Infinity Fabric.

A side-effect of this multi-die design is that full symmetry with respect to access of memory (such as that for random access memory (RAM) and I/O ports (for devices such as network interface cards (NIC) or hard drives (HD) are no longer practical. Instead, individual sets of memory or I/O are connected to individual die of a CPU. Communication between memory or I/O connected to different die may be made by traversing the connected die for the source, through an inter-die switch fabric, and traversing the connected die for the destination. This may be slower than connecting with traversing the connected die for the source alone to a port connected to the same die. Embodiments of the present disclosure may address one or more of these shortcomings.

BRIEF DESCRIPTION OF THE DRAWINGS

FIG. 1 is an illustration of an example system for acceleration of data between a network and local I/O in a NUMA system, according to embodiments of the present disclosure.

DETAILED DESCRIPTION

FIG. 1 is an illustration of an example system 100 for acceleration of data between a network and local I/O in a NUMA system, according to embodiments of the present disclosure.

System 100 may include a multi-die CPU 102. CPU 102 may include any suitable number of die, such as four die—104A, 104B, 104C and 104D. Each die 104 may be implemented in a same, similar, or different manner. Dies 104 may be connected together within one physical package in a single socket. Dies 104 may be communicatively connected together within CPU 102 with high-speed inter-die data fabric 118. Fabric 118 may be implemented through any suitable combination of digital and analog circuitry.

System 100 may include a control circuit 116 to control communication between dies 104 and other elements external to CPU 102, as discussed in further detail below. Control circuit 116 may be implemented by any suitable combination of analog circuitry, digital circuitry, instructions for execution by a processor. Control circuit 116 may be implemented within any suitable portion of system 100. Control circuit 116 may be implemented within CPU 102 as shown in FIG. 1 as control circuit 116A. Moreover, control circuit 116 may be implemented within part of system 100 communicatively coupled with CPU 102, as discussed in more detail below. Moreover, control circuit 116 may be implemented partially within CPU 102 and partially without CPU 102.

Each of dies 104 may include any suitable number and kind of elements. For example, each die 104 may include any suitable number of processing cores 106. Die 1 104A is illustrated with an expanded view of its cores, enumerated 106A-1-106A-N, for reference.

In one embodiment, each die 104 may include an interface 108 for communication outside of CPU 102 to an eventual network connection. Such an interface 108 may be implemented in any suitable manner, such as by analog circuitry, digital circuitry, instructions for execution by a processor, or any suitable combination thereof. Interface 108 may implement any suitable communications or data protocol, such as a peripheral component interconnect (PCI) or PCI express (PCIe) interface. Interface 108 may be configured for communication outside of CPU 102 to receive or send data outside of system 100, such as a data source over Ethernet, discussed in more detail below.

Each die may further include any suitable number and kind of interfaces for communication with elements outside of CPU 102 but local to system 100. The elements may be producers or consumers of data. The elements may include, for example, random access memory (RAM) 120, storage media 122, or other elements 124 such as storage, transcoders, off-CPU compute circuits or modules for data processing, cryptographic processors, co-processors, machine-learning processors, blockchain processors, virtual currency processors, graphics processors, digital signal processors, other network ports, or generic offload processors. Any suitable interfaces may be used for communication with such elements, such as interfaces 110, 112, 114. Interfaces 110, 112, 114 may be implemented by analog circuitry, digital circuitry, instructions for execution by a processor, or any suitable combination thereof. Interfaces 110, 112, 114 may be implemented by, for example, PCI, PCIe, SATA, or other formats or protocols. The storage media devices 122 may include any suitable implementation of storage media, such as hard disks, hard drives, virtual arrays of disks, solid state drives, redundant array of independent disks (RAID), network-attached storage (NAS), optical disks, Flash memory, or Flash drives.

Each instance of RAM 120 may represent a different location or address range of the same memory, or different memory. For example, RAM 120A may represent a range of addresses within the same memory or memory bank as RAM 120B. Each instance of RAM illustrated in FIG. 1 may be an instance of RAM that is physically close or quickly or efficiently accessible to the associated die 104. For example, RAM 120A may be a memory location that is physically closer or more quickly or efficiently accessible to die 1 104A than other instances of RAM 120 (such as 120B) to die 1 104A. Similarly, each instance of storage media 122 may represent a different portion of the same storage media or a different storage media, and each instance of storage media 122 associated with a respective die 104 may be physically closer or more quickly or efficiently accessible to the respective die 104 than others of storage media 122.

Each of cores 106 may be configured to access corresponding RAM 120, storage media 122, and other elements 124 connected to its corresponding die 104 in an efficient manner. This may be provided, for example, through the corresponding interface 110, 112, 114. For example, cores 106A may access RAM 120A, storage media 122A, and other elements 124A through interfaces 110A, 112A, and 114A, respectively.

However, access by a given core 106 to RAM 120, storage media 122, and other elements 124 of a different die 104 may be a slower process. For example, cores 106A may access RAM 120B, storage media 122B, and other elements 124B through interfaces 110B, 112B, and 114B by traversing fabric 118. This access may be slower than access by cores 106A of RAM 120A, storage media 122B, and other elements 124B. Access by a given core 106 to RAM 120, storage media 122, and other elements 124 of a different die 104 may be described as a NUMA system.

When designing a data storage system, the use of I/O to and from RAM 120, storage media 122, and other elements 124 may be high. Often such a system may use all of the I/O lines available on a CPU. In other implementations, a system may include multiple network interface cards (NIC) with a NIC for a given die so that outside network traffic via, for example, Ethernet, may reach a given die efficiently. In yet other implementations, a system may include a single NIC. The single NIC may be connected to one of the multiple dies. In either of these implementations, traffic arriving at (or transmitted from) the NIC that is connected to a single die (whether multiple NICs exist or not) that is intended for a resource such as RAM, hard disks, or other elements of a different die may traverse the inter-die fabric. Hard disks and memory may be distributed across multiple dies to make best use of I/O lines from respective dies. This means that typically most pieces of data sent to or from the CPU may have to be moved from one die to another before being written to or from the appropriate resource.

For example, using the elements discussed in FIG. 1, in other implementations wherein source data arrives at an NIC connected to a given die, such as die 104C, destinated for hard drive 122A, such data may be transferred by the sequence of the NIC to die 104C, die 104C through interface 108C to one of cores 106C, from the one of cores 106C to fabric 118, from fabric 118 to die 1 104A, from die 104A to one of cores 106A such as 106A-1, from core 106A-1 through interface 112A to storage media 122A. By limiting the number of connections from outside of the system to the CPU, I/O pins on the CPU are potentially saved, but the transfer is less efficient due to the number of elements that must be traversed, as discussed above. Such a configuration may directly affect the performance of applications that move data from a network interface to any external peripherals. However, embodiments of the present disclosure may accelerate such data movement.

In one embodiment, system 100 may use or include a multi-host network controller, such as a multi-host NIC 126. NIC 126 may be implemented by analog circuitry, digital circuitry, instructions for execution by a processor, or any suitable combination thereof. NIC 126 may be configured to also be used in backplane applications where multiple non-cache-coherent CPUs are intended to share a single connection to a high-speed network. For example, a server or backplane board that has multiple distinct and separate CPUs may have one physical network port on the board which is accessible to all the CPUs. NIC 126 may be implemented as a PCIe device which may allow multiple different PCIe hosts to connect to it. Each PCIe host might not know about the other PCIe hosts and may believe that it is talking to a single-host NIC. NIC 126 may be configured to perform the aggregation and switching of packets to and from the real physical network, such as to or from a data source over Ethernet.

In a multi-die configuration, such as system 100 and CPU 102, NIC 126 may be implemented as a multi-host NIC and may be connected to PCIe interfaces 108 on each die 104. Each die 104 may be a host. Instead of using an instance of NIC 126 to connect to multiple CPUs, multi-host NIC 126 may instead have multiple connections to the same CPU 102, making a single connection to each die 104A, 104B, 104C, 104D. This way, as data comes in and out of the network attached to NIC 126, it can be routed appropriately to a respective die 104 that is directly attached to the element, such as RAM 120, storage media 122, or other elements 124, for which data is to be input or output.

Routing in NIC 126 may be performed by any suitable mechanism. For example, control circuit 116B may be implemented within NIC 126 and may be configured to control the routing of data to our from NIC 126 to dies 104. Moreover, control circuit 116A may perform such routing, or cause such routing, whether in total or in part.

NIC 126 may include a network interface 128 configured to provide a connection to an external source, such as an Ethernet network. NIC 126 may include host interfaces 130 to provide a connection to each of dies 104. Interfaces 128, 130 may be implemented by analog circuitry, digital circuitry, instructions for execution by a processor, or any suitable combination thereof.

For data from the external network to be provided to portions of system 100, each packet may be routed from an appropriate interface 130 to the appropriate PCIe interface 108 on a respective die 104 by NIC 126—that is, interfaces 130, 108 connected to the die 104 directly connected to the target resource 120, 122, 124 for the received data. For data written to the network, each packet may be sent by the software to the appropriate NIC interface 130 connection—that is, the NIC interface 130 connected to the same die 104 as the resource 120, 122, 124 or core 106 generating the data. By using multi-host NIC 126 in this way, data movement across fabric 118 may be reduced, and the need to move data first to a different die 104 when moving data to the external network may be reduced.

A result of this configuration, CPU 102 and any operating systems thereon may perceive connections to multiple NICs, while in reality there may be instead multiple connections to a single multi-host NIC 126. The connection from a given die 106 may be through respective ones of interfaces 108, 130 to NIC 126. Each of these multiple connections may be referred to herein as a logical NIC. The interface 108, interface 130, or any suitable combination thereof for a given die 106 may appear to be a different NIC and thus may be referred to as the logical NIC. In order to route data packets properly, each logical NIC may be given a different network address, such as an internet protocol (IP) address. Software executing on CPU 102, while moving data between the external network and resources 120, 122, 124 may be configured to use the network address for the logical NIC which is connected to the same die 104 as the target or source resource 120, 122, 124.

A data transfer might be simpler than in other solutions, and thus faster, and save power as fewer accesses are required. For example, consider data coming from the network and going to hard drive 122A. Instead of routing through a single connection of a given die of CPU 102 that is not actual die connected to hard drive 122A (such as die 3 104C), data coming in from the network to NIC 126 for hard drive 122A may be routed through interface 130A to interface 108A to core 106A-1, then through interface 112A to storage media 122A. Data The same data paths, NIC 126→interface 130→interface 108→core 106→interface 110, 112, 114→resource 120, 122, 124 can be used by any of dies 104. However, as mentioned earlier, the software implementation running on CPU 102 may ensure that these data paths have been programmed into an application by, for example, IP addresses. Although the amount of connectivity to CPU 102 has been increased by using additional I/O ports for interfaces 130, and the programming is more complex wherein each die 104 has its own address, the result may be a more efficient data transfer.

In another use case, data traversing a given die 104, wherein the data is present at a given die 104 but is to be sent to another die 104, may require first writing the data to RAM 120 connected to the given die 104. The data may be then read from RAM 120 and then sent over fabric 118. For example, without a multi-host implementation of NIC 126 (as presented and configured in the present disclosure), data for die 1 104A received from interface 108C from NIC 126 at die 3 104C may be written to RAM 120C, read from RAM 120C, sent through fabric 118, written to RAM 120A, read from RAM 120A, and then applied to the destination peripheral. Embodiments of the present disclosure may eliminate the need to write data to and read data from RAM 120. For example, in the configuration shown in FIG. 1, data from NIC 126 can be supplied directly to die 104A via interface 108A, thus removing any interaction from die 3 104C or fabric 118. This may not only result in a faster solution, eliminating the time needed to perform these operations, but also power savings, as RAM 120 need not be powered up for the associated reads and writes for other resources. Furthermore, this may result in a faster solution, eliminating the need to traverse fabric 118.

In yet another use case, data processing by CPU 102 may be more efficient through the availability of direct interfaces 108, 130 between individual semiconductor dies 104 and NIC 126. For example, data may arrive from NIC 126 to semiconductor die 104A, or data may be provided by peripherals 124A, RAM 120A, or storage media device 122A. The data may be generated by execution of a thread on semiconductor die 104A. In some cases, the data may be processed by the execution of the thread on semiconductor 104A. Subsequently, the data may be requested by a thread executing on another semiconductor die, such as semiconductor die 104B. Control circuit 116 may route the data from semiconductor die 104A through fabric 118 to semiconductor die 104B. The thread executing thereupon may process the data. Then, if the data is to be sent out from NIC 126, the processed data may be provided through interfaces 108B, 130B to NIC 126, which may then route the processed data appropriately, such as to external consumers. The implementation of the system of FIG. 1, wherein each semiconductor die 104 has an interface to NIC 126, may avoid the steps of having to send the processed data back through fabric 118 again to another semiconductor die 104. In other implementations, wherein only one of semiconductor dies 104 has an interface with MC 126 and semiconductor die 104B does not include an interface with NIC 126, the processed data would have to be routed through fabric 118 from semiconductor die 104B to the semiconductor die that did have such an interface. This extra step causes latency.

As shown above, embodiments of the present disclosure may include a CPU. The CPU may include any suitable number of semiconductor dies. Each semiconductor die may include one or more processing cores.

In combination with any of the above embodiments, embodiments of the present disclosure may include a multi-host NIC. The NIC may include an external connection interface circuit. The circuit may be implemented in any suitable manner. The NIC may include CPU interface circuits. The circuits may be implemented in any suitable manner. The NIC may be configured to be communicatively coupled to an external data source through the external connection interface circuit. The external data source may be any suitable source, such as an Ethernet network or another system. The NIC may be communicatively coupled to each of the semiconductor dies through a respective CPU interface circuit. The NIC may receive data from the external data source for a first peripheral connected to a first semiconductor die of the CPU. The NIC may receive data from the external data source for a second peripheral connected to a second semiconductor die of the CPU.

In combination with any of the above embodiments, embodiments of the present disclosure may include a control circuit. The control circuit may be implemented by analog circuitry, digital circuitry, instructions for execution by a processor, or any suitable combination thereof. The control circuit may be configured to route the data for the first peripheral through a first CPU interface circuit of the plurality of CPU interface circuits. The control circuit may be implemented fully or partially in the NIC, the CPU, a die communicatively coupled to the NIC and the CPU, or any suitable combination thereof.

In combination with any of the above embodiments, the peripherals may include a storage media device, random-access memory, or an offload processor. The storage media device may include a hard disk, Flash drive, or any other suitable storage media.

In combination with any of the above embodiments, the first semiconductor die may be configured to route the data for the first peripheral through a memory connected to the first semiconductor die to the first peripheral.

In combination with any of the above embodiments, each interface between the NIC and a given semiconductor die may be configured to be represented as a logical NIC to applications executing on the CPU.

In combination with any of the above embodiments, each interface between the NIC and a given semiconductor die may be configured to have a different unique address for applications executing on the CPU.

In combination with any of the above embodiments, the first semiconductor die is configured to receive data from the first peripheral for the external data source while the second semiconductor die is configured to receive data from the second peripheral for the external data source. In such embodiments, the control circuit may be further configured to route the data from the first peripheral for the external data source through the first CPU interface circuit and through the external connection interface circuit, and to route the data from the second peripheral for the external data source through the second CPU interface circuit and through the external connection interface circuit.

In combination with any of the above embodiments, the first semiconductor die may be further configured to receive or generate second data. The first semiconductor die may be connected to the NIC through the first CPU interface circuit. The control circuit may be further configured to route the second data from the first semiconductor die through an inter-die fabric to the second semiconductor die based upon a determination that the second semiconductor die is to process the second data. The second semiconductor die may be further configured to, upon completion of processing of the second data, send results of processing of the data through the second CPU interface circuit to the NIC. The second CPU interface circuit may be different than the first CPU interface circuit.

In combination with any of the above embodiments, The system of claim 1, wherein the data from the external data source for the first peripheral and the second peripheral are routed to the respective semiconductor dies without use of an inter-die fabric connected internally between the semiconductor dies.

In combination with any of the above embodiments, the data for the first peripheral may avoid being written to a memory connected to the second semiconductor die. In combination with any of the above embodiments, the data for the first peripheral avoids traversal through an inter-die fabric connected between the first semiconductor die and the second semiconductor die.

Embodiments of the present disclosure may include a system. The system may include the NIC and the control circuit. The system may include the control circuit and the CPU. The system may include the NIC and the CPU. The system may include the control circuit, the CPU, and the NIC.

Embodiments of the present disclosure may include a method. The method may include operations of any of the above embodiments.

Those in the art will understand that a number of variations may be made in the disclosed embodiments, all without departing from the spirit and scope of the invention, which is defined solely by the appended claims.

What is claimed is:

1. A system, comprising:
   a central processing unit (CPU) including a plurality of semiconductor dies, each semiconductor die including one or more processing cores;
   a multi-host network interface card (NIC) including an external connection interface circuit and a plurality of CPU interface circuits, wherein the NIC is configured to:
      be communicatively coupled to an external data source through the external connection interface circuit;
      be communicatively coupled to each of the semiconductor dies through a respective CPU interface circuit;
      receive data from the external data source for a first peripheral connected to a first semiconductor die of the CPU; and
      receive data from the external data source for a second peripheral connected to a second semiconductor die of the CPU; and
   control circuit configured to:
      route the data for the first peripheral through a first CPU interface circuit of the plurality of CPU interface circuits; and
      route the data for the second peripheral through a second CPU interface circuit of the plurality of CPU interface circuits.

2. The system of claim 1, wherein the peripheral is a storage media device, random-access memory, or an offload processor.

3. The system of claim 1, wherein the first semiconductor die is configured to route the data for the first peripheral through a memory connected to the first semiconductor die to the first peripheral.

4. The system of claim 1, wherein the external data source is a network.

5. The system of claim 1, wherein each interface between the NIC and a given semiconductor die is configured to be represented as a logical NIC to applications executing on the CPU.

6. The system of claim 1, wherein each interface between the NIC and a given semiconductor die is configured to have a different unique address for applications executing on the CPU.

7. The system of claim 1, wherein:
   the first semiconductor die is configured to receive data from the first peripheral for the external data source;
   the second semiconductor die is configured to receive data from the second peripheral for the external data source; and
   the control circuit is further configured to:
      route the data from the first peripheral for the external data source through the first CPU interface circuit and through the external connection interface circuit; and
      route the data from the second peripheral for the external data source through the second CPU interface circuit and through the external connection interface circuit.

8. The system of claim 1, wherein:
   the first semiconductor die is further configured to receive or generate second data;
   the first semiconductor die is connected to the NIC through the first CPU interface circuit;
   the control circuit is further configured to route the second data from the first semiconductor die through an inter-die fabric to the second semiconductor die based upon a determination that the second semiconductor die is to process the second data; and
   the second semiconductor die is further configured to, upon completion of processing of the second data, send results of processing of the data through the second CPU interface circuit to the NIC, the second CPU interface circuit different than the first CPU interface circuit.

9. The system of claim 1, wherein the data from the external data source for the first peripheral and the second peripheral are routed to the respective semiconductor dies without use of an inter-die fabric connected internally between the semiconductor dies.

10. The system of claim 1, wherein the data for the first peripheral avoids being written to a memory connected to the second semiconductor die.

11. The system of claim 1, wherein the data for the first peripheral avoids traversal through an inter-die fabric connected between the first semiconductor die and the second semiconductor die.

12. A method, comprising:
    communicatively coupling a multi-host network interface card (NIC) with a central processing unit (CPU), the NIC including an external connection interface circuit and a plurality of CPU interface circuits, the CPU including a plurality of semiconductor dies, each semiconductor die including one or more processing cores;
    communicatively coupling the NIC to each of the semiconductor dies through a respective CPU interface circuit;

at the NIC:
receiving data from the external data source for a first peripheral connected to a first semiconductor die of the CPU; and
receive data from the external data source for a second peripheral connected to a second semiconductor die of the CPU;
routing the data for the first peripheral through a first CPU interface circuit of the plurality of CPU interface circuits; and
routing the data for the second peripheral through a second CPU interface circuit of the plurality of CPU interface circuits.

13. The method of claim 12, further comprising, at the first semiconductor die, routing the data for the first peripheral through a memory connected to the first semiconductor die to the first peripheral.

14. The method of claim 12, further comprising representing each interface between the NIC and a given semiconductor die as a logical NIC to applications executing on the CPU.

15. The method of claim 12, further comprising, for each interface between the NIC and a given semiconductor die, providing a different unique address for applications executing on the CPU.

16. The method of claim 12, further comprising:
at the first semiconductor die, receiving data from the first peripheral for the external data source;
at the second semiconductor die, receiving data from the second peripheral for the external data source;
routing the data from the first peripheral for the external data source through the first CPU interface circuit and through the external connection interface circuit; and
routing the data from the second peripheral for the external data source through the second CPU interface circuit and through the external connection interface circuit.

17. The method of claim 12, further comprising:
at the first semiconductor die, receiving or generating second data;
connecting the first semiconductor die to the NIC through the first CPU interface circuit;
routing the second data from the first semiconductor die through an inter-die fabric to the second semiconductor die based upon a determination that the second semiconductor die is to process the second data; and
from the second semiconductor die and upon completion of processing of the second data, sending results of processing of the data through the second CPU interface circuit to the NIC, the second CPU interface circuit different than the first CPU interface circuit.

18. The method of claim 12, further comprising routing the data from the external data source for the first peripheral and the second peripheral to the respective semiconductor dies without use of an inter-die fabric connected internally between the semiconductor dies.

19. The method of claim 12, further comprising avoiding writing the data for the first peripheral to a memory connected to the second semiconductor die.

20. The method of claim 12, further comprising avoiding traversal of the data for the first peripheral through an inter-die fabric connected between the first semiconductor die and the second semiconductor die.

* * * * *